(12) United States Patent
Morisaki

(10) Patent No.: US 9,862,279 B2
(45) Date of Patent: Jan. 9, 2018

(54) VEHICLE CONTROLLER

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 14/975,034

(22) Filed: Dec. 18, 2015

(65) Prior Publication Data

US 2016/0231123 A1 Aug. 11, 2016

(30) Foreign Application Priority Data

Feb. 5, 2015 (JP) ................................. 2015-020954

(51) Int. Cl.
*B60L 11/18* (2006.01)
*G01C 21/34* (2006.01)

(52) U.S. Cl.
CPC .......... *B60L 11/18* (2013.01); *G01C 21/3469* (2013.01); *Y02T 10/7258* (2013.01)

(58) Field of Classification Search
CPC .. B60L 11/18; G01C 21/3469; Y02T 10/7258
See application file for complete search history.

(56) References Cited

U.S. PATENT DOCUMENTS

| 2006/0142915 A1* | 6/2006 | Isono ...................... B60K 6/46 701/36 |
| 2009/0326750 A1 | 12/2009 | Ang |
| 2011/0202223 A1* | 8/2011 | Nefcy .................... B60K 6/445 701/22 |
| 2013/0296102 A1 | 11/2013 | Banker et al. |
| 2015/0116336 A1* | 4/2015 | Yoshimura .............. B60R 11/02 345/520 |
| 2015/0134206 A1* | 5/2015 | Matsunaga ......... B60W 20/104 701/48 |
| 2015/0241227 A1* | 8/2015 | Ogawa ............... G01C 21/3469 701/22 |
| 2015/0241228 A1* | 8/2015 | Ogawa ................... G01C 21/34 701/22 |

FOREIGN PATENT DOCUMENTS

| CN | 101516703 A | 8/2009 |
| JP | 2007-050888 A | 3/2007 |
| JP | 2009-012605 A | 1/2009 |
| JP | 2013-169915 A | 9/2013 |
| JP | 2015-030407 A | 2/2015 |
| JP | 2015-209113 A | 11/2015 |

* cited by examiner

*Primary Examiner* — Frederick Brushaber
(74) *Attorney, Agent, or Firm* — Oliff PLC

(57) ABSTRACT

A vehicle consumes electric power of a battery when traveling in a first mode and sustains a storage power amount of the battery when traveling in a second mode. The travel planning unit forms a travel plan that assigns one of the first mode and the second mode to each zone included in a route. A control unit sets a travel mode of the vehicle to the first mode when the vehicle deviates from the route that is in accordance with the formed travel plan.

11 Claims, 10 Drawing Sheets

VEHICLE CONTROLLER

BACKGROUND OF THE DISCLOSURE

The present disclosure relates to a vehicle controller that performs travel control on a vehicle based on a plurality of travel modes planned for the vehicle. The vehicle uses an internal combustion engine and a motor as drive sources.

A plug-in hybrid vehicle is well known in the art as a vehicle that uses an internal combustion engine and a motor as drive sources. Such a vehicle travels in modes including a first mode, which serves as a charge depleting (CD) mode and consumes electric power of the battery, and a second mode, which serves as a charge sustaining (CS) mode and sustains the amount of power stored in the battery. For example, the CD mode gives priority to EV traveling, in which the motor drives the vehicle while the internal combustion engine is stopped. Thus, use of the internal combustion engine is limited or prohibited. The CS mode gives priority to HV traveling, in which the internal combustion engine and the motor are both used to sustain the storage power amount of the battery.

Japanese Laid-Open Patent Publication No. 2009-12605 describes a vehicle controller that performs travel control on the vehicle by calculating a route, which includes a plurality of zones from an originating point to a destination, and planning which one of the first mode and the second mode is to be assigned to each zone of the calculated route as the travel mode for the vehicle.

In the device described in Japanese Laid-Open Patent Publication No. 2009-12605, the second mode is applied to the zone that has the highest average vehicle speed in the route, and the first mode is applied to the remaining zones. Then, the device estimates the state of charge of the battery that would be obtained when the vehicle travels in the applied mode from the current location and reaches the destination. When the estimated value is smaller than the lower limit, which corresponds to a depletion state of the battery, the device changes the mode of the zone having the second highest average vehicle speed from the first mode to the second mode and estimates the battery state of charge that would be obtained when the vehicle reaches the destination.

The device sequentially changes the mode of the zones having higher average vehicle speed from the first mode to the second mode so that the estimated value of the battery state of charge is approximate to and above the lower limit at the destination. When the estimated value of the battery state of charge remains above the lower limit when the vehicle reaches the destination, the device plans the travel modes for the vehicle using the currently applied mode of each zone.

SUMMARY

The device described in Japanese Laid-Open Patent Publication No. 2009-12605 plans the assigned modes so that when the vehicle travels along a route from an originating point to a destination, the device actively uses the motor in zones suitable for EV traveling and consumes electric power of the battery so that the estimated value of the battery state of charge is approximate to and above the lower limit when the vehicle reaches the destination. This reduces emissions that would be produced when the internal combustion engine is used. However, such advantageous effects can be expected only when the vehicle travels along the mode-planned route. When the vehicle deviates from the route, the effects of the battery consumption are not always obtained.

It is an object of the present disclosure to provide a vehicle controller that increases battery consumption even when the vehicle deviates from a planned route.

One aspect of the present disclosure provides a vehicle controller that performs travel control on a vehicle. The vehicle selects one of a first mode and a second mode as a travel mode and travels in the travel mode. The vehicle consumes electric power of a battery when traveling in the first mode and sustains a storage power amount of the battery when traveling in the second mode. The vehicle travels along a route from an originating point to a destination that includes a plurality of zones. The vehicle controller includes a travel planning unit and a control unit. The travel planning unit is configured to form a travel plan that assigns one of the first mode and the second mode to each of the zones included in the route. The control unit is configured to control traveling of the vehicle based on the formed travel plan. The control unit is configured to set the travel mode of the vehicle to the first mode when the vehicle deviates from the route that is in accordance with the formed travel plan.

As described above, a travel plan normally assigns modes so that the power stored in the battery is depleted. In this regard, in the above configuration, even when the vehicle deviates from the route that is in accordance with the travel plan, the travel mode of the vehicle is forcibly controlled in the first mode. This increases battery consumption and avoids a situation in which unused storage power remains in the battery due to the deviation of the vehicle from the planned route.

In one mode of the above vehicle controller, when the vehicle deviates from the route that is in accordance with the travel plan and then returns to the route, the control unit is configured to maintain the travel mode of the vehicle in the first mode for a predetermined time or a predetermined distance regardless of the formed travel plan.

In the above configuration, when the vehicle deviates from the route that is in accordance with the travel plan and travels in the first mode, the vehicle continues to travel in the first mode until the predetermined time elapses or the vehicle travels for the predetermined distance regardless of the mode assigned to the zone of the route, where the vehicle returns, and even when the vehicle returns to the route and then immediately deviates from the route again. This limits the occurrence of the so-called control hunting, in which the shifting between the first mode and second mode is frequently repeated, regardless of the content of the travel plan of the route, to which the vehicle returns, and the repetitive deviation of the vehicle from the route.

In one mode of the above vehicle controller, when the vehicle deviates from the route that is in accordance with the travel plan and then returns to the route, the control unit is configured to maintain the travel mode of the vehicle in the first mode in a zone of the route where the vehicle first travels subsequent to the return regardless of the formed travel plan.

In the above configuration, when the vehicle deviates from the route that is in accordance with the travel plan and travels in the first mode, the vehicle may return to a zone of the route that is assigned with the second mode. Even in this case, the vehicle continues to travel the zone in the first mode. This avoids control hunting caused by the mode shifting that occurs when the vehicle returns to a zone of the route that is assigned with the second mode but the remainder of the zone is short and the next zone is assigned with the first mode.

In one mode of the above vehicle controller, when the vehicle deviates from the route that is in accordance with the travel plan and then returns to the route, if the second mode is assigned to a zone of the route where the vehicle first travels subsequent to the return and a distance to a zone where the first mode is assigned for a first time after the zone where the vehicle first travels subsequent to the return is shorter than or equal to a fixed distance, the control unit is configured to maintain the travel mode of the vehicle in the first mode at least until the zone where the first mode is assigned for the first time after the zone where the vehicle first travels subsequent to the return.

In the above configuration, when the vehicle deviates from the route that is in accordance with the travel plan and travels in the first mode, the vehicle may return to a zone of the route that is assigned with the second mode. Even in this case, if the distance to a zone that is assigned with the first mode for the first time after the first zone subsequent to the return is shorter than or equal to the fixed distance, the vehicle continues to travel in the first mode. This avoids control hunting caused by the mode shifting that occurs when the distance to the zone, which is assigned with the first mode and located after the zone to which the vehicle returns, is shorter than the fixed distance.

In one mode of the above vehicle controller, the travel planning unit is configured to recalculate the route and form a new travel plan when a fixed time elapses from when the vehicle deviates from the route that is in accordance with the travel plan. When the vehicle deviates from the route and the route is recalculated, the control unit is configured to maintain the travel mode of the vehicle in the first mode for a predetermined time or a predetermined distance regardless of the newly formed travel plan.

In the above configuration, when the vehicle deviates from the route that is in accordance with the travel plan, the vehicle travels in the first mode. Then, after the fixed time elapses, the route is recalculated to form a new travel plan. Regardless of the content of the newly formed travel plan and even when the vehicle immediately deviates from the recalculated route, the vehicle continues to travel in the first mode until the predetermined time elapses or the vehicle travels for the predetermined distance. Thus, the occurrence of the so-called control hunting, in which the shifting between the first mode and second mode is frequently repeated, may be limited regardless of the content of the travel plan of the route and the repetitive deviation from the route.

In one mode of the above vehicle controller, the travel planning unit is configured to recalculate the route and form a new travel plan when a fixed time elapses from when the vehicle deviates from the route that is in accordance with the travel plan. When the vehicle deviates from the route and the route is recalculated, the control unit is configured to maintain the travel mode of the vehicle in the first mode in a zone of the route where the vehicle first travels subsequent to the recalculation regardless of the newly formed travel plan.

In the above configuration, when the vehicle deviates from the route that is in accordance with the travel plan and travels in the first mode, the route is recalculated to form a new travel plan after the fixed time elapses. Even when the first zone of the recalculated route is assigned with the second mode, the vehicle continues to travel the first zone of the recalculated route in the first mode. This avoids control hunting caused by the mode shifting that occurs when the first zone of the recalculated route is assigned with the second mode but the remainder of the zone is short and the next zone is assigned with the first mode.

In one mode of the above vehicle controller, the travel planning unit is configured to recalculate the route and form a new travel plan when a fixed time elapses from when the vehicle deviates from the route that is in accordance with the travel plan. When the vehicle deviates from the route and the route is recalculated, if the second mode is assigned to a zone of the route where the vehicle first travels subsequent to the recalculation and a distance to a zone where the first mode is assigned for a first time after the zone where the vehicle first travels subsequent to the recalculation is shorter than or equal to a fixed distance, the control unit is configured to maintain the travel mode of the vehicle in the first mode at least until the zone where the first mode is assigned for the first time after the zone where the vehicle first travels subsequent to the recalculation.

In the above configuration, when the vehicle deviates from the route that is in accordance with the travel plan and travels in the first mode, the route is recalculated to form a new travel plan after the fixed time elapses. Even when the first zone of the recalculated route is assigned with the second mode, if the distance to a zone that is assigned with the first mode for the first time after the first zone is shorter than or equal to the fixed distance, the vehicle continues to travel in the first mode. This avoids control hunting caused by the mode shifting that occurs when the distance to the zone, which is assigned with the first mode and located after a zone including the first zone of the newly formed travel plan, is shorter than the fixed distance.

In one mode of the above vehicle controller, when deviation of the vehicle from the route or the recalculation is repeated for a predetermined number of times or more, the control unit is configured to maintain the travel mode of the vehicle in the first mode, and the travel planning unit is configured to stop forming the travel plan.

In the above configuration, even when the formation of the travel plan is interrupted, priority is given to the first mode. This avoids a situation in which unused storage power remains in the battery.

Another aspect of the present disclosure provides a vehicle controller that performs travel control on a vehicle. The vehicle selects one of a first mode and a second mode as a travel mode and travels in the travel mode. The vehicle gives priority to driving of a motor while limiting or prohibiting driving of an internal combustion engine when traveling in the first mode. The vehicle drives at least one of the motor and the internal combustion engine when traveling in the second mod. The vehicle travels along a route from an originating point to a destination that includes a plurality of zones. The vehicle controller includes a travel planning unit and a control unit. The travel planning unit forms a travel plan that assigns one of the first mode and the second mode as the travel mode to each of the zones included in the route. The control unit controls traveling of the vehicle based on the formed travel plan. The control unit is configured to forcibly set the travel mode of the vehicle in the first mode when the vehicle deviates from the route that is in accordance with the travel plan.

As described above, a travel plan normally assigns the mode so that the power stored in the battery is depleted. In this regard, in the above configuration, even when the vehicle deviates from the route that is in accordance with the travel plan, the travel mode of the vehicle is forcibly controlled in the first mode. This increases battery consumption and avoids a situation in which unused storage power remains in the battery due to the deviation of the vehicle from the planned route.

BRIEF DESCRIPTION OF THE DRAWINGS

The Disclosure, together with objects and advantages thereof, may best be understood by reference to the following description of the presently preferred embodiments together with the accompanying drawings in which.

DESCRIPTION OF THE PREFERRED EMBODIMENTS

First Embodiment

Figure 1:
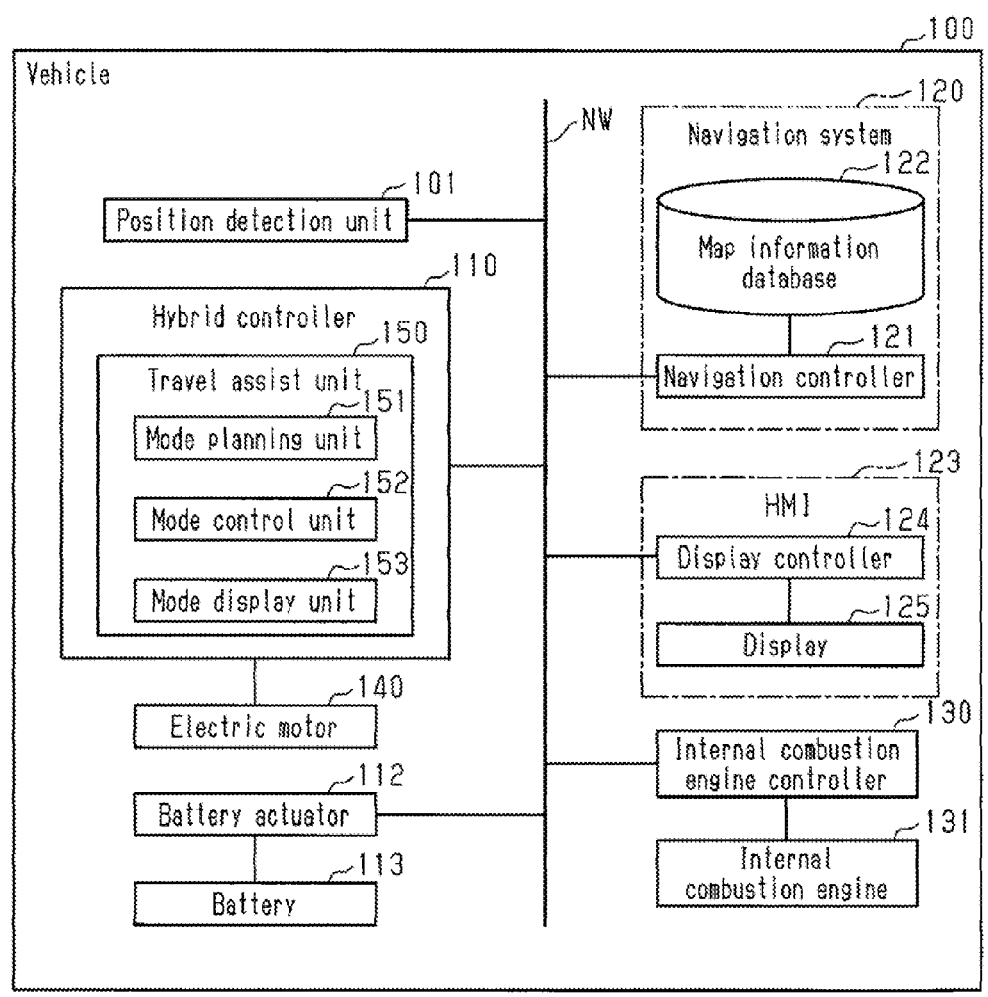
FIG. 1 is a schematic block diagram showing the structure of a first embodiment of a vehicle controller.

A first embodiment of a vehicle controller will now be described with reference to FIGS. 1 to 3. The vehicle controller of the first embodiment is a device that is installed in a vehicle 100, which uses an internal combustion engine 131 and an electric motor 140 as drive sources, and controls a travel mode of the vehicle 100. The vehicle 100 is, for example, a plug-in hybrid vehicle.

The structure of the vehicle controller of the first embodiment will now be described.

The vehicle 100 travels in two modes. One mode is a charge depleting (CD) mode, which consumes power of a battery 113 and serves as a first mode. Another mode is a charge sustaining (CS) mode, which sustains the amount of power stored in the battery 113 and serves as a second mode. For example, the CD mode gives priority to EV traveling, in which the vehicle 100 drives only the electric motor 140 and stops the internal combustion engine 131 when traveling. Thus, power of the battery 113 is consumed. The CS mode gives priority to HV traveling, which drives the internal combustion engine 131 and the electric motor 140. Thus, the storage power amount of the battery 113 is sustained. Additionally, the vehicle 100 includes a navigation system 120, which sets a route from an originating point to a destination when the destination is set. Additionally, a hybrid controller 110 includes a travel assist unit 150, which assigns one of the CD mode and the CS mode to a zone included in the set route to form a travel plan. Here, the travel plan does not include the setting of the route and only refers to the assignment of the mode to the set route. In general, the travel plan decreases emissions compared to when traveling without a travel plan. Less emissions are produced as the vehicle 100 travels for a longer distance in the EV mode.

As shown in FIG. 1, the vehicle controller is applied to the vehicle 100 that includes a position detection unit 101 or the like as a component for obtaining information of the state of the vehicle 100. Such a component is connected via an in-vehicle network NW such as a controller area network (CAN) or the like to various controllers including an internal combustion engine controller 130, the hybrid controller 110, a navigation controller 121, and a display controller 124. The internal combustion engine controller 130 performs drive control on the internal combustion engine 131. The hybrid controller 110 performs drive control on the electric motor 140. Each of the various controllers is the so-called electronic control unit (ECU) and includes a microcomputer having an arithmetic unit and a memory. Each controller performs various controls when the arithmetic unit arithmetically processes programs and parameters, which are stored in the memory.

The position detection unit 101 detects the current position of the vehicle 100. The position detection unit 101 includes, for example, a global positioning system (GPS). The GPS receives a GPS satellite signal and specifies the current position of the vehicle 100 based on the received GPS satellite signal. The position detection unit 101 outputs information indicating the specified current position, for example, the latitude and longitude of the current position. In addition to or instead of the GPS satellite signal, the position detection unit 101 may be configured to detect the current position of the vehicle 100 using a different satellite signal or a road-to-vehicle communication system.

Additionally, the vehicle 100 includes the navigation system 120, which guides a route of the vehicle 100. The navigation system 120 includes a map information database 122, which stores map information, and the navigation controller 121, which performs a guiding process of the route of the vehicle 100 using the map information stored in the map information database 122.

The map information stored in the map information database 122 includes node information, related to nodes indicating positions on roads, and link information, related to links connecting two adjacent nodes. The node information includes position information of the nodes and road information of the nodes. The link information includes road information of the links. The road information included in the link information includes information indicating a travel load applied to the vehicle 100 when driving. In this case, the travel load is determined based on a travel time, a travel speed, a fuel consumption amount, an electric power consumption amount, and the like. Alternatively, the travel load may be calculated from parameters including information including road gradient information and the weight of the vehicle 100.

The navigation controller 121 obtains the information indicating the current position of the vehicle 100 from the position detection unit 101. Additionally, when a destination is set by the driver or the like, the navigation controller 121 searches a route from the originating point of the vehicle 100 to the destination with reference to the map information database 122 using Dijkstra's algorithm or the like. Although the originating point of the vehicle 100 generally corresponds to the current position of the vehicle 100, the originating point and the current position may be separately set. Further, the navigation controller 121 outputs the entire link information included in the searched route and the information of the travel load included in the link information to the hybrid controller 110 via the in-vehicle network NW.

The vehicle 100 also includes the battery 113, which functions as the drive source of the electric motor 140, and a battery actuator 112, which controls charging and discharging of the battery 113. The battery 113 is chargeable via the battery actuator 112 from an external power source when connected to an inlet (not shown). The battery actuator 112 is connected via the in-vehicle network NW to various controllers including the internal combustion engine controller 130, the hybrid controller 110, and the navigation controller 121.

The hybrid controller 110 functions to set the present distribution (output ratio) of drive force for the internal combustion engine 131 and the electric motor 140. Additionally, the hybrid controller 110 functions to perform drive assistance based on the route and to have the vehicle 100 travel in the mode that is assigned to the zone in which the vehicle 100 is currently traveling.

More specifically, the hybrid controller 110 sets the distribution of drive force based on detection results of an acceleration sensor, a vehicle speed sensor, and an accelerator sensor, which are not shown, or the like. Additionally, based on the distribution of drive force, the hybrid controller 110 generates a control instruction of the battery actuator 112 related to the discharging or the like of the battery 113 and information related to the control amount of the internal combustion engine 131 that is calculated by the internal combustion engine controller 130. The hybrid controller 110 sets the distribution of braking force for the brake and the electric motor 140 based on detection results of the acceleration sensor, the vehicle speed sensor, and a brake sensor. Based on the distribution of the braking force, the hybrid controller 110 generates a control instruction of the battery actuator 112 related to the charging or the like of the battery 113 and information related to the control amount of the brake that is calculated by the internal combustion engine controller 130. That is, when outputting the generated control instructions to the battery actuator 112, the hybrid controller 110 controls the charging and discharging of the battery 113. More specifically, the discharging of the battery 113, serving as the power source of the electric motor 140, drives the electric motor 140, and the regeneration of the electric motor 140 charges the battery 113.

The hybrid controller 110 includes the travel assist unit 150, which receives the route of the vehicle 100 from the navigation controller 121 and outputs drive assist information of the vehicle 100 corresponding to the received route. The travel assist unit 150 includes a mode planning unit 151, which functions as a travel planning unit. The mode planning unit 151 forms a travel plan in which the one of the CD mode and the CS mode is assigned to a plurality of links included in the route received from the navigation controller 121. Here, a unit to which one of the CD mode and the CS mode is assigned may be other than a link as long as the route can be divided in correspondence with the travel load.

Figure 3:
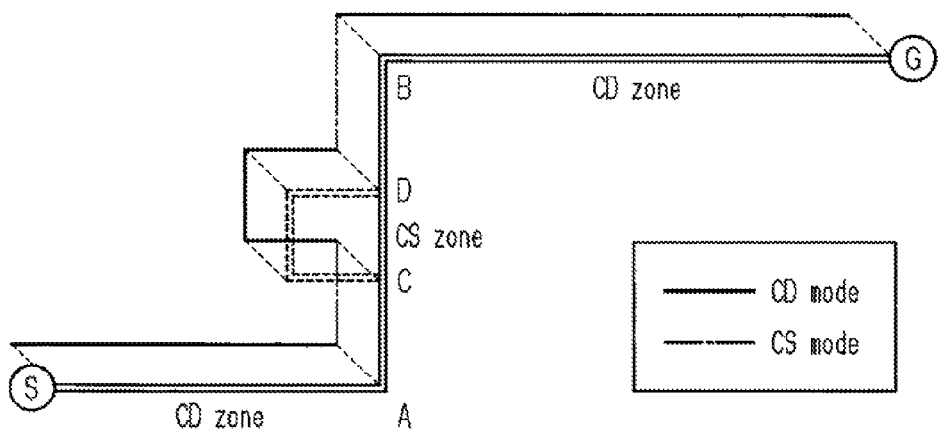
FIG. 3 is a diagram showing an example of the mode control performed by the vehicle controller of the first embodiment on a route that is in accordance with a travel plan and a route deviated from the route.

FIG. 3 shows an example of the travel plan in which consecutive links, to which the same mode is assigned, are indicated as a single zone for the sake of simplicity. Thus, in the travel plan shown in FIG. 3, the route from originating point S to destination G includes three zones. Additionally, in the travel plan shown in FIG. 3, the "CD zone" refers to a zone to which the CD mode is assigned, and the "CS zone" refers to a zone to which the CS mode is assigned.

More specifically, the CD mode actively consumes the power charged in the battery 113 and does not sustain the storage power amount of the battery 113. That is, the CD mode gives priority to the electric motor 140 when traveling. Here, even in the CD mode, when the acceleration pedal is greatly depressed to increase power, the internal combustion engine 131 is driven and fuel is consumed.

The CS mode sustains the storage power amount of the battery 113 within a predetermined range with respect to a reference value. More specifically, in the CS mode, the internal combustion engine 131 is driven to perform a regenerative operation on the electric motor 140 if necessary to sustain the storage power amount of the battery 113. Here, even in the CS mode, when the storage power amount of the battery 113 exceeds the reference value, the electric motor 140 is driven and the internal combustion engine 131 is stopped. In this case, the reference value of the CS mode is appropriately set to a value of the storage power amount of the battery 113 when the mode is shifted from the CD mode to the CS mode or a value of the storage power amount of the battery 113 that is needed to maintain the properties of the battery 113. That is, the CS mode sustains the storage power amount of the battery 113 by consuming fuel. The CD mode gives priority to consumption of the storage power amount of the battery 113 rather than consumption of fuel.

Additionally, in any mode, to cope with the variable travel load, at least one of the internal combustion engine 131 and the electric motor 140 may be driven as necessary in accordance with the present distribution (output ratio) of the drive force for the internal combustion engine 131 and the electric motor 140, which is determined by the hybrid controller 110.

The travel assist unit 150 includes a mode control unit 152, which controls the travel mode of the vehicle 100 based on the travel plan in which one of the CD mode and the CS mode is assigned to each link included in the route. When the vehicle 100 deviates from the planned route, the mode control unit 152 forcibly sets the travel mode of the vehicle 100 in the CD mode. Then, when the vehicle 100 returns to the planned route after deviated from the route, the mode control unit 152 controls the travel mode of the vehicle 100 in accordance with the mode of the travel plan. Additionally, when the navigation system 120 recalculates the route after the vehicle 100 deviates from the planned route, the mode control unit 152 controls the travel mode of the vehicle 100 in accordance with the mode of a travel plan that is formed based on the recalculated route.

The travel assist unit 150 also includes a mode display unit 153. The mode display unit 153 outputs the travel plan, which serves as the drive assist information and is formed by the mode planning unit 151, to human machine interfaces 123 (HMIs) via the in-vehicle network NW. The mode display unit 153 outputs information for displaying an image to the HMIs 123. In addition to or instead of the image information, the mode display unit 153 may output voice information.

The HMIs 123 includes a display 125, which is capable of indicating letters and images, and the display controller 124, which performs display control. The display 125 includes, for example, a monitor, a head-up display, a meter panel, and the like. The HMIs 123 may share a monitor or the like with the navigation system 120. Additionally, the HMIs 123 may output the voice information, which is received from the travel assist unit 150, via a speaker.

The operation of the vehicle controller of the first embodiment, which is mainly performed by the travel assist unit 150, will now be described.

When a destination is set in the navigation system 120 and a route to the destination is calculated, the travel assist unit 150 receives information of the route from the originating point to the destination from the navigation controller 121.

When the travel assist unit 150 obtains the route, the mode planning unit 151 assigns one of the CD mode and the CS mode to each link in the obtained route to form a travel plan. The mode planning unit 151 forms the travel plan so that the emissions are decreased or the EV traveling distance is extended. In general, when the CD mode, which gives priority to the EV traveling, is assigned, reduced fuel consumption decreases the emissions. However, the distance to which the CD mode can be assigned is limited depending on the storage power amount of the battery 113. Thus, the travel plan is formed so that the CD mode is assigned to a maximal zone of the route and the CS mode is assigned to a zone where the CD mode cannot be assigned. More specifically, the mode planning unit 151 assigns the CD mode to each zone of the route that has a relatively small travel load and the CS mode to each zone of the route that has a relatively large travel load. Here, the degree of the travel load of each zone is determined from the relative relationship with other zones in the route. Thus, the travel load of each zone is determined by comparing the travel load of the other zones in the route. Alternatively, in forming the travel plan, the low travel load zone may include a zone having a low average vehicle speed and a zone corresponding to a town, and the high travel load zone may include a zone having a high average vehicle speed and a zone corresponding to a highway. Moreover, the travel plan may be formed based on a different known condition when the condition is appropriate to decrease the emissions or extend the EV traveling distance.

As shown in FIG. 3, when the vehicle 100 starts traveling, the mode control unit 152 determines whether or not the vehicle 100 is traveling on the planned route and controls the mode based on the determination result. Here, when the vehicle 100 travels along the planned route, which is indicated by a solid double-lined portion, the mode control unit 152 controls the mode of the vehicle 100 in accordance with the travel plan. More specifically, the mode control unit 152 controls a zone from originating point S to point A in the CD mode, a zone from point A to point B in the CS mode, and a zone from point B to destination G in the CD mode.

The control procedures performed by the mode control unit 152 will now be described with reference to FIG. 2.

Figure 2:
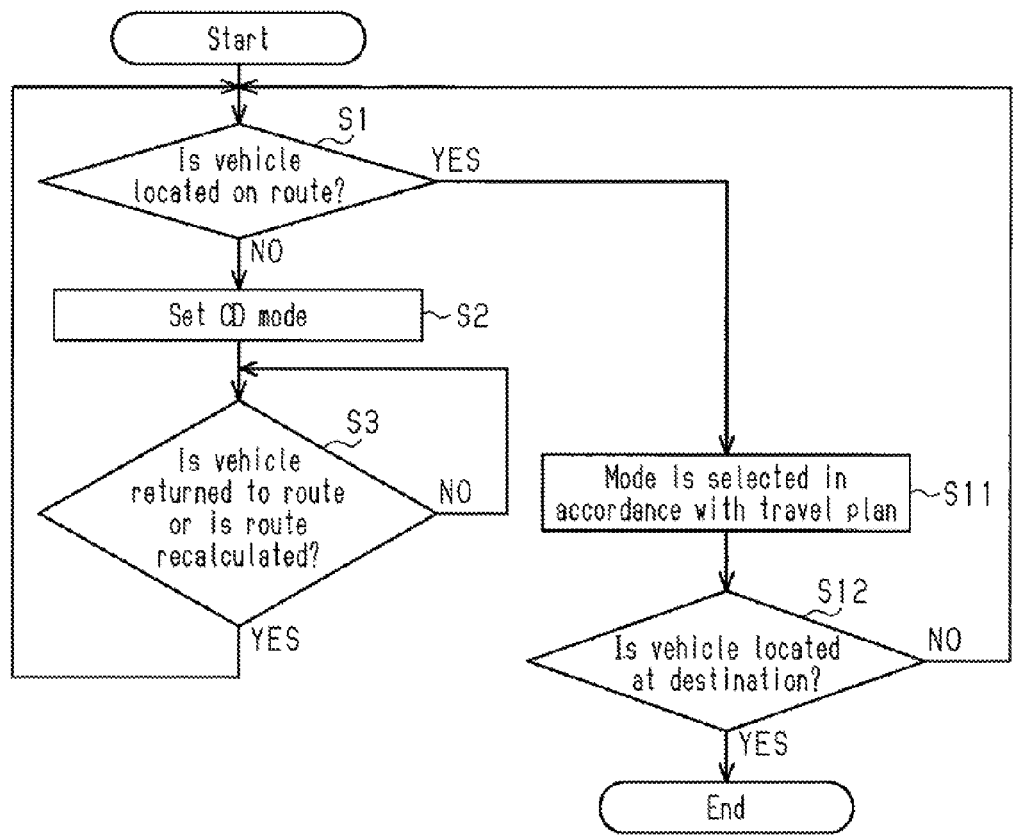
FIG. 2 is a flowchart showing the procedures of a mode control process performed by the vehicle controller of the first embodiment.

When starting the process of FIG. 2, the mode control unit 152 determines whether or not the vehicle 100 is located on the route (step S1). More specifically, the mode control unit 152 recognizes the current position of the vehicle 100, for example, based on the position information obtained from the position detection unit 101 and determines whether or not the current position of the vehicle 100 is located on the planned route.

When determining that the vehicle 100 is traveling on the planned route (solid double-lined portion of FIG. 3) (step S1 of FIG. 2: YES), the mode control unit 152 selects the mode in accordance with the travel plan (step S11). More specifically, the mode control unit 152 controls the mode of the vehicle 100 in accordance with the travel plan, which is formed in the route so that the emissions are decreased. Then, the mode control unit 152 determines whether or not the current position of the vehicle 100 is located at destination G (step S12). More specifically, the mode control unit 152 determines whether or not the vehicle 100 has arrived at destination G and terminates the process when determining that the vehicle 100 has arrived at destination G. When determining that the vehicle 100 is not located at destination G (step S12 of FIG. 2: NO), the mode control unit 152 proceeds to step S1 and continues the process. When determining that the vehicle 100 is located at destination G (step S12 of FIG. 2: YES), the mode control unit 152 terminates the mode control process.

On the other hand, when determining that the vehicle 100 is not traveling on the planned route, that is, the vehicle 100 deviates from the route (S1 of FIG. 2: NO), the mode control unit 152 sets the travel mode of the vehicle 100 in the CD mode (step S2 of FIG. 2). More specifically, referring to FIG. 3, when the vehicle 100 deviates from the route at point C and returns to the route at point D, the mode control unit 152 forcibly controls the zone from point C to point D in the CD mode regardless of the CS mode planned in the zone from point A to point B. Thus, the vehicle 100 travels in the CD mode on a route deviated from the route (dashed double-lined portion of FIG. 3). This enhances power consumption of the battery 113.

The mode control unit 152 determines whether or not the vehicle 100 returns to the planned route or the navigation system 120 recalculates the route. The mode control unit 152 repeats the above determination until the vehicle 100 returns to the route or the navigation system 120 recalculates the route (step S3 of FIG. 2).

As described above, in this case, the vehicle 100 returns to the route at point D. Thus, the mode control unit 152 determines that the vehicle 100 returns to the planned route (step S3 of FIG. 2: YES) and proceeds to step S1. More specifically, when the vehicle 100 returns to the planned route at point D, the mode control unit 152 controls the travel mode of the vehicle 100 in the CS mode, which is assigned to the zone from point A to point B including point D.

When a fixed time (e.g., one minute) elapses after the vehicle 100 deviates from the route, the navigation system 120 recalculates the route and the mode planning unit 151 forms a new travel plan in the recalculated route. Thus, when determining that the route is recalculated at point D, shown in FIG. 3, the mode control unit 152 controls the travel mode of the vehicle 100 from point D based on the newly formed travel plan.

As described above, the first embodiment has the advantage described below.

(1) When the vehicle 100 deviates from the planned route, the travel mode of the vehicle 100 is forcibly controlled in the CD mode. This increases power consumption of the battery 113 and avoids a situation in which unused storage power remains in the battery 113 due to the deviation of the vehicle 100 from the planned route.

Figure 4:
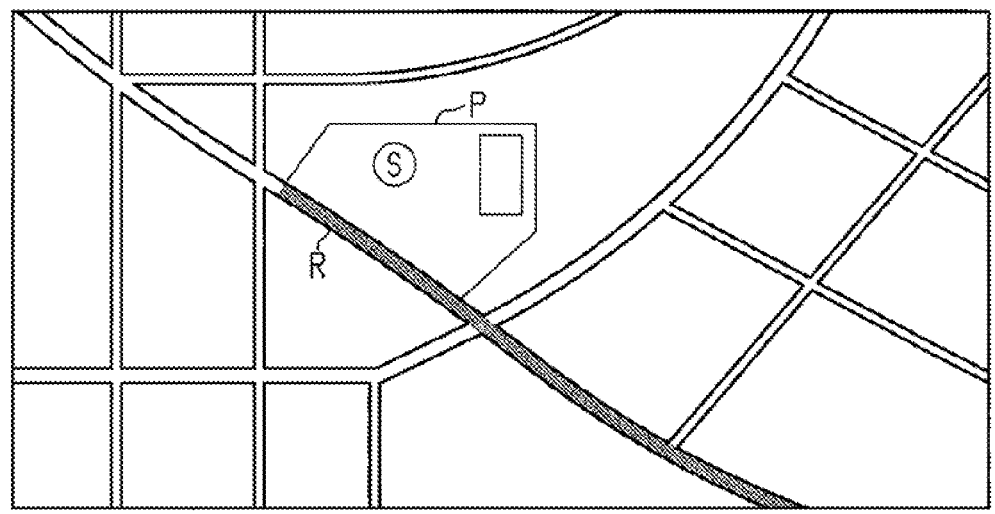
FIG. 4 is a diagram showing an example of the route without route information.
Figure 5:
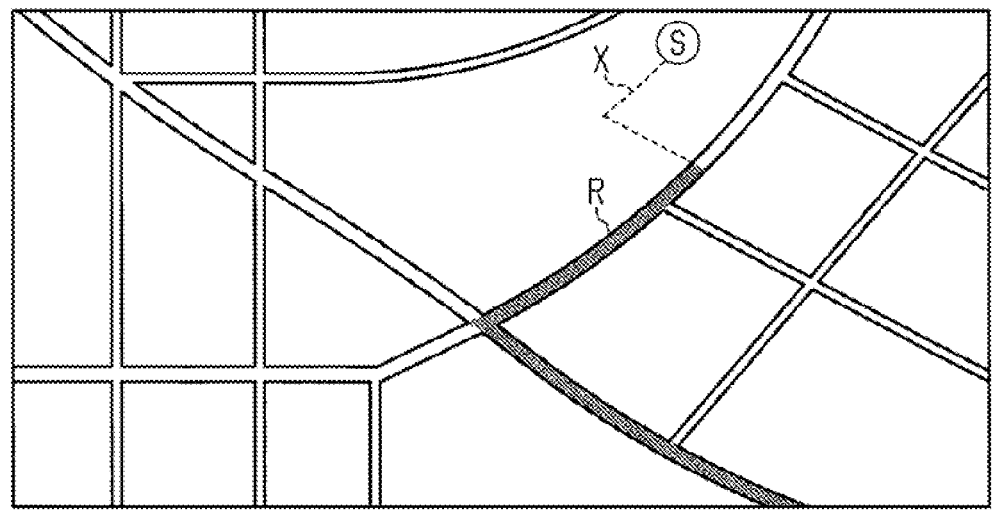
FIG. 5 is a diagram showing another example of the route without route information.

Additionally, control such as that performed in the first embodiment is effective when travel control is performed in a location without route information (e.g., refer to FIGS. 4 and 5), that is, a location in which a travel plan cannot be formed. Here, the "location in which a travel plan cannot be formed" corresponds to a location in which information needed to form the travel plan, such as information of a travel load, cannot be obtained. Such a location is normally unregistered as a road in the map information database 122 of the navigation system 120. In FIGS. 4 and 5, a road that is likely to be selected in the route of the vehicle 100 is shaded for the sake of illustration.

FIG. 4 shows the vehicle 100, which is located in a large parking area P of a large shopping center or the like. The parking area P includes parking spaces and passages, which are unregistered as a road in the map information database 122 of the navigation system 120. Thus, a path from originating point S of the vehicle 100 to road R, which is registered in the map information database 122 of the navigation system 120, that is, has the road information, is deviated from the route.

In this case, while the vehicle 100 is located in the parking area P of a large shopping center or the like, the mode control unit 152 determines that the vehicle 100 is not located on the planned route (step S1 of FIG. 2: NO) and forcibly controls the travel mode of the vehicle 100 in the CD mode. When the vehicle 100 reaches road R, having the road information, the travel plan may be formed.

FIG. 5 shows the vehicle 100, which is located on a road in a private property or a narrow road. Roads in a private property and narrow roads are often unregistered as a road in the map information database 122 of the navigation system 120. The unregistered road includes road X, which does not have road information. Thus, a path from originating point S of the vehicle 100 to road R, which is registered in the map information database 122 of the navigation system 120, that is, has the road information, is deviated from the route.

While the vehicle 100 is located on the road in the private property or the narrow road, the mode control unit 152 also determines that the vehicle 100 is not located on the planned route and forcibly controls the travel mode of the vehicle 100 in the CD mode. In the same manner as described above, when the vehicle 100 reaches road R, having the road information, the travel plan may be formed.

Moreover, the vehicle 100 may travel on a location having no map information, such as a riverside or a seaside. In such a case, the mode control unit 152 also determines that the vehicle 100 is not located on the planned route and forcibly controls the travel mode of the vehicle 100 in the CD mode.

Second Embodiment

A second embodiment of the vehicle controller will now be described with reference to FIGS. 6 to 9.

The vehicle controller of the second embodiment differs from that of the first embodiment in that when the vehicle 100 deviates from the planned route and then the vehicle returns to the route or the route is recalculated, the travel mode of the vehicle 100 is maintained in the CD mode for a predetermined time. The description will focus on the differences from the first embodiment.

Figure 6:
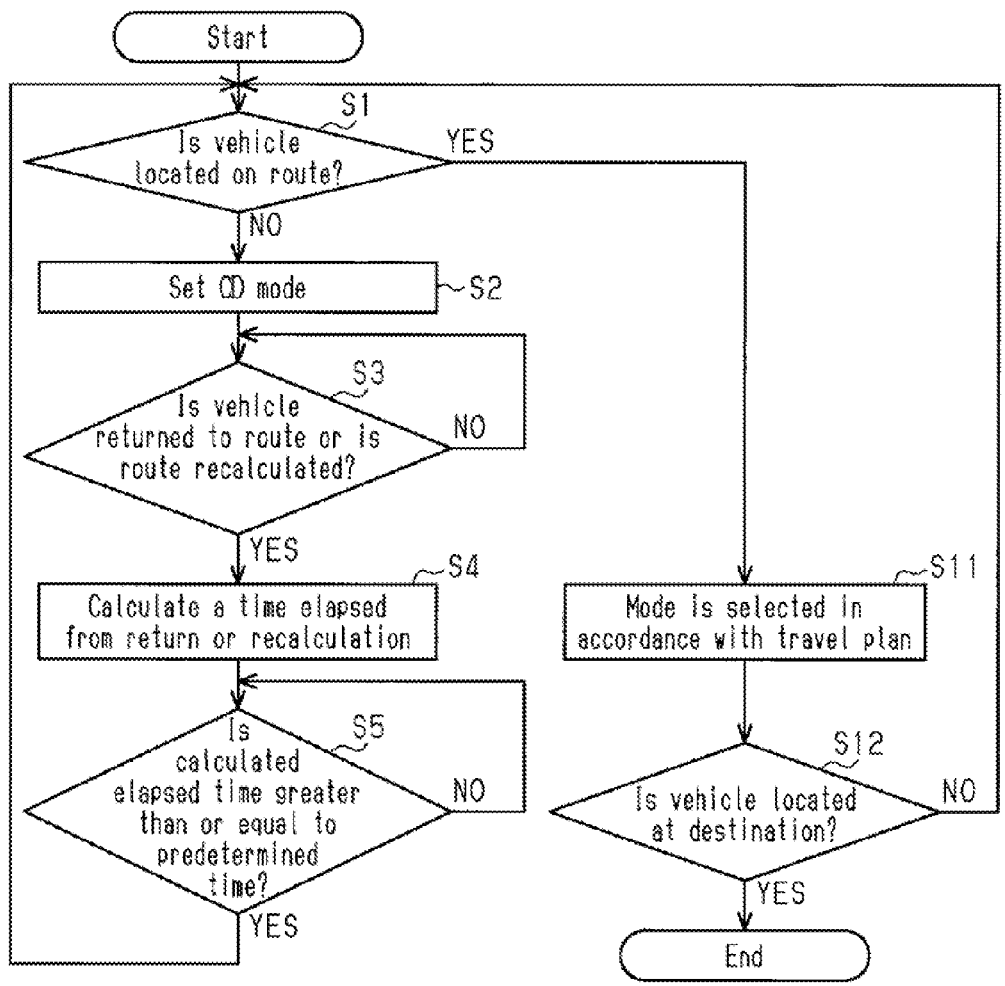
FIG. 6 is a flowchart showing the procedures of the mode control process performed by a second embodiment of the vehicle controller.

As shown in FIG. 6, the mode control unit 152 of the second embodiment performs the process that is the same as steps S1 to S3 of the first embodiment. Then, the mode control unit 152 calculates a time elapsed from when determining that the vehicle 100 returns to the planned route or the navigation system 120 recalculates the route (step S4).

Here, the vehicle 100 may deviate from the planned route, return to the zone to which the CS mode is assigned (CS zone), and again deviate from the route. In such a case, if the vehicle 100 is controlled in the CD mode only while the vehicle 100 deviates from the route, the mode would be shifted from the CD mode to the CS mode then in the CD mode in a short time, which is so-called control hunting. In this regard, when the vehicle 100 deviates from the planned route and then returns to the route, the mode control unit 152 maintains the travel mode of the vehicle 100 in the CD mode for the predetermined time.

Also, the vehicle 100 may deviate from the planned route, travel along a CS zone of a recalculated route, and then deviate from the recalculated route. In such a case, if the vehicle 100 is controlled in the CD mode only while the vehicle 100 deviates from the route, the so-called control hunting would occur in which the mode is switched from the CD mode to the CS mode and then in the CD mode in a short time. In this regard, when the vehicle 100 deviates from the planned route and then the route is recalculated, the mode control unit 152 maintains the travel mode of the vehicle 100 in the CD mode for the predetermined time.

Figure 7:
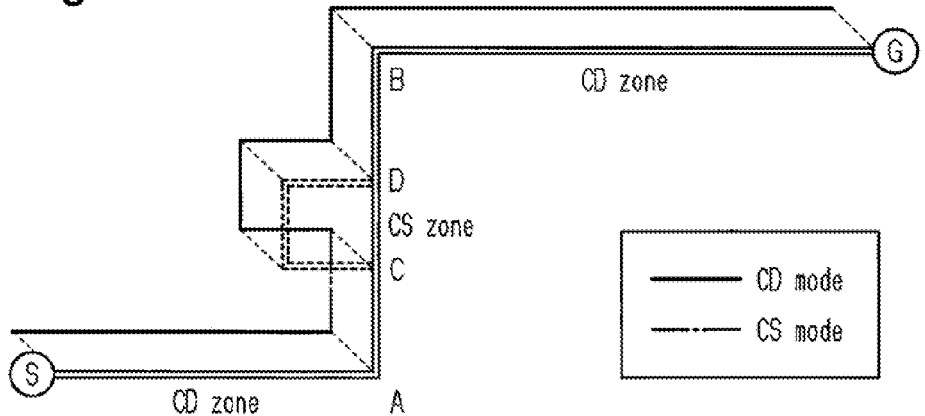
FIG. 7 is a diagram showing an example of the mode control performed by the vehicle controller of the second embodiment on a route that is in accordance with a travel plan and a route deviated from the route.

More specifically, referring to FIGS. 6 and 7, when determining that the vehicle 100 deviates from the planned route at point C, shown in FIG. 7, and then returns to the route at point D, shown in FIG. 7 (step S3 of FIG. 6: YES), the mode control unit 152 calculates a time elapsed from when the vehicle 100 returns to the route at point D (step S4). Then, the mode control unit 152 determines whether or not the calculated elapsed time is greater than or equal to the predetermined time (step S5). When determining that the calculated elapsed time is less than the predetermined time from point D to point B, shown in FIG. 7 (step S5: NO), the mode control unit 152 maintains the travel mode of the vehicle 100 in the CD mode for the predetermined time after the vehicle 100 returns to the route. That is, when the vehicle 100 returns to the planned route at point D, the mode control unit 152 forcibly controls the vehicle 100 in the CD mode regardless of the CS mode planned in the zone between point D and point B. As a result, the travel mode of the vehicle 100 is maintained in the CD mode throughout the zone from point C to point B, shown in FIG. 7.

On the other hand, when determining that the calculated elapsed time reaches or exceeds the predetermined time after the vehicle 100 passes point B, shown in FIG. 7 (step S5: YES), the mode control unit 152 proceeds to step S1. Thus, when the predetermined time elapses after the vehicle returns to the route, the travel mode of the vehicle 100 is controlled based on the travel plan. These processes limit the occurrence of the above control hunting.

Figure 8:
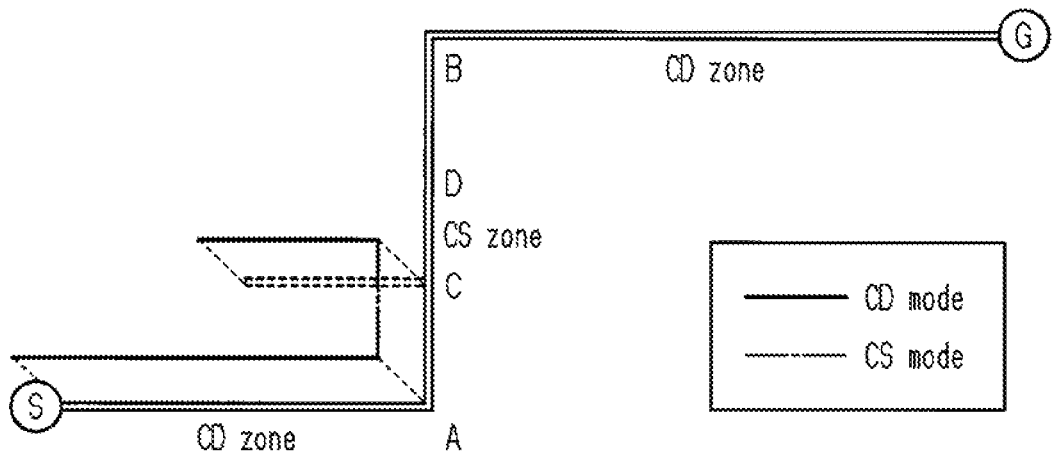
FIG. 8 is a diagram showing another example of the mode control performed by the vehicle controller of the second embodiment on a route that is in accordance with a travel plan and a route deviated from the route.
Figure 9:
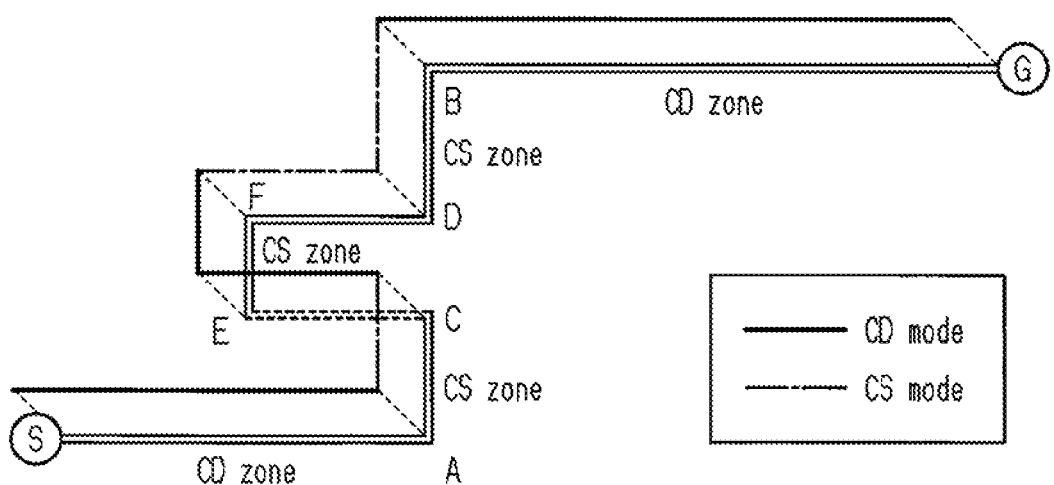
FIG. 9 is a diagram showing a further example of the mode control performed by the vehicle controller of the second embodiment on the route that is in accordance with the travel plan, the route deviated from the route, and a recalculated route.

Additionally, as shown in FIG. 8, when the vehicle 100 travels the zone between point A and point B and deviates from the route at point C, the travel mode of the vehicle 100 is controlled in the CD mode. Then, as shown in FIG. 9, when the fixed time elapses at point E after the vehicle 100 deviates from the route, the navigation system 120 recalculates the route from point E to destination G and the mode planning unit 151 forms the travel plan in the recalculated route. Thus, when determining that the route is recalculated at point E, the mode control unit 152 maintains the travel mode of the vehicle 100 in the CD mode for the predetermined time.

When determining that the navigation system 120 recalculates the route at point E, shown in FIG. 9 (step S3 of FIG. 6: YES), the mode control unit 152 calculates a time elapsed from point E (step S4). Then, the mode control unit 152 determines whether or not the calculated elapsed time is greater than or equal to the predetermined time (step S5). When determining that the calculated time elapsed from the route recalculation is less than the predetermined time from point E to point F, shown in FIG. 9 (step S5: NO), the mode control unit 152 maintains the travel mode of the vehicle 100 in the CD mode for the predetermined time from the route recalculation.

When determining that the calculated elapsed time is greater than or equal to the predetermined time at point F, shown in FIG. 9 (step S5: YES), the mode control unit 152 proceeds to step S1. More specifically, in this case, when the vehicle 100 returns to the planned route at point F, the mode control unit 152 controls the vehicle 100 in the CS mode, which is reassigned to the zone between point F and point B including point D. Even in this case, the CD mode is forcibly maintained for the predetermined time until the mode is selected based on the newly formed travel plan. This limits the occurrence of the above control hunting.

In this manner, the mode control unit 152 returns to the normal control, in which the modes are selected, when the fixed time elapses from the return or the recalculation of the route. This limits the occurrence of the above control hunting even when the vehicle 100 returns to a planned or re-planned route and then immediately deviates from the route.

The second embodiment has the advantages described below in addition to advantage (1) of the first embodiment.

(2) When the vehicle 100 deviates from the planned route and travels in the CD mode, the vehicle 100 continues to travel in the CD mode until the predetermined time elapses regardless of the mode assigned to the zone of the route where the vehicle 100 returns and even when the vehicle 100 returns to the route and then immediately deviates from the route again. This limits the occurrence of the so-called control hunting, in which the shifting between the CD mode and CS mode is frequently repeated, regardless of the content of the travel plan of the route to which the vehicle 100 returns and the repetitive deviation from the route.

(3) When the vehicle 100 deviates from the planned route, the vehicle 100 travels in the CD mode. Then, after the fixed time elapses, the route is recalculated to form a new travel plan. Regardless of the content of the new travel plan and even when the vehicle 100 immediately deviates from the recalculated route again, the vehicle 100 continues to travel in the CD mode until the predetermined time elapses. Thus, the occurrence of the so-called control hunting, in which the shifting between the CD mode and CS mode is frequently repeated, may be limited regardless of the content of the travel plan of the route and the repetitive deviation from the route.

Third Embodiment

A third embodiment of the vehicle controller will now be described with reference to FIGS. 10 to 12. The vehicle controller of the third embodiment differs from that of the first embodiment in that when the vehicle 100 deviates from the planned route and then the vehicle returns to the route or the route is recalculated, the travel mode of the vehicle 100 in the first zone is maintained in the CD mode. The description will focus on the differences from the first embodiment.

Figure 10:
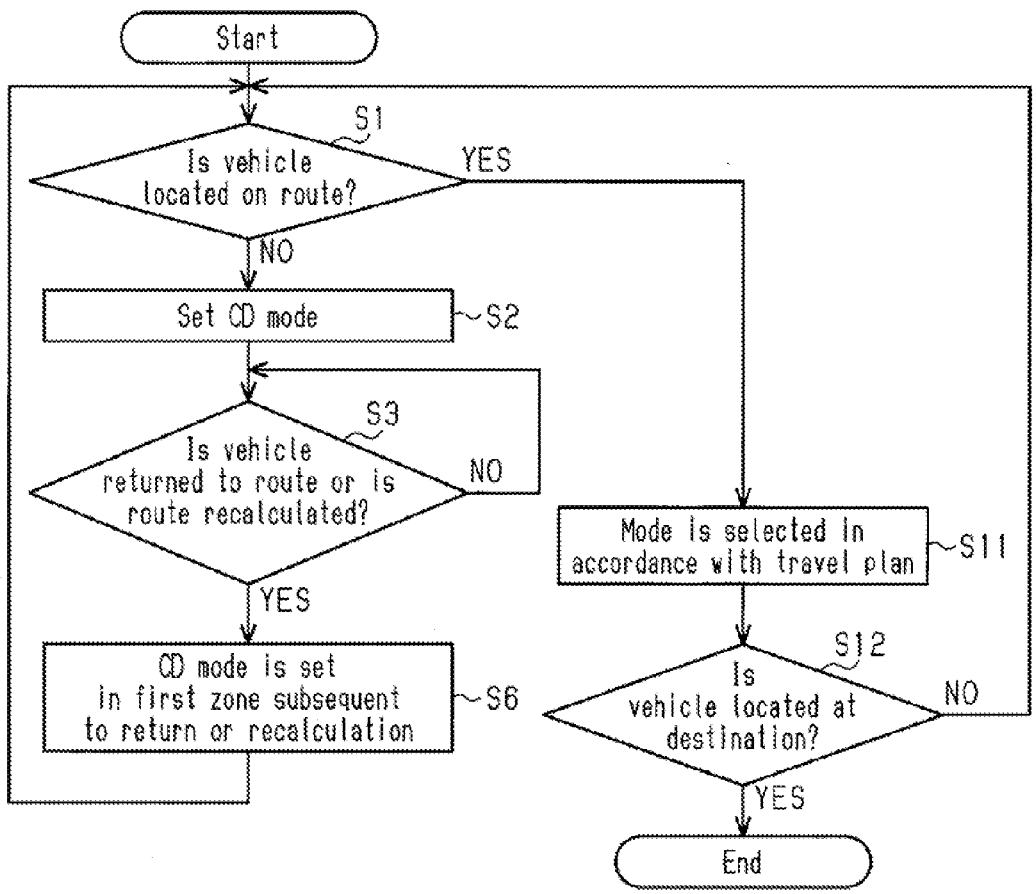
FIG. 10 is a flowchart showing the procedures of the mode control process performed by a third embodiment of the vehicle controller.

As shown in FIG. 10, the mode control unit 152 of the third embodiment performs the process that is the same as steps S1 to S3 of the first embodiment. After determining that the vehicle 100 returns to the planned route or the navigation system 120 recalculates the route, the mode control unit 152 sets the CD mode in the first zone subsequent to the return or recalculation (step S6).

Here, the vehicle 100 may deviate from the route when traveling a CS zone and then return to the CS zone. In such a case, if the vehicle 100 is controlled in the CD mode only while the vehicle 100 deviates from the route, the so-called control hunting would occur in which the mode is shifted from the CS mode in the CD mode then to the CS mode in a short time. In this regard, when the vehicle 100 deviates from the planned route and then returns to the route, the mode control unit 152 maintains the CD mode in the zone through which the vehicle 100 first travels subsequent to the return.

Additionally, when the vehicle 100 deviates from the route in a CS zone and the route is recalculated, the first zone of the recalculated route may be assigned with the CS mode. In such a case, if the vehicle 100 is controlled in the CD mode only while the vehicle 100 deviates from the route, the so-called control hunting would also occur in which the mode is shifted from the CS mode in the CD mode then to the CS mode in a short time. In this regard, when the vehicle 100 deviates from the planned route and then the route is recalculated, the mode control unit 152 maintains the CD mode in the zone of the route through which the vehicle 100 first travels subsequent to the recalculation.

Figure 11:
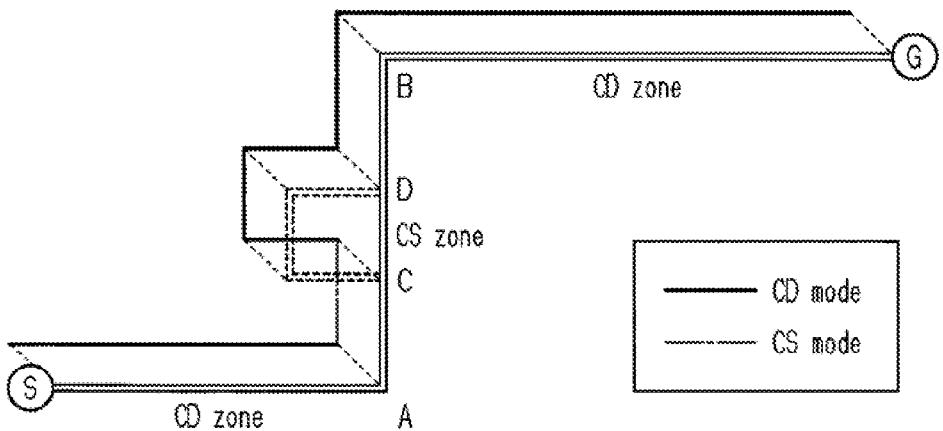
FIG. 11 is a diagram showing an example of the mode control performed by the vehicle controller of the third embodiment on a route that is in accordance with a travel plan and a route deviated from the route.

More specifically, as shown in FIG. 10, when determining that the vehicle 100 deviates from the planned route at point C, shown in FIG. 11, and returns to the route at point D, also shown in FIG. 11 (step S3 of FIG. 10: YES), the mode control unit 152 maintains the CD mode in a zone between point D and the point B, which serves as the first zone including point D in which the vehicle 100 travels subsequent to the return (step S6 of FIG. 10). As a result, the travel mode of the vehicle 100 is maintained in the CD mode throughout the zone from point C, at which the vehicle 100 deviates from the route, to point B.

In this manner, in the present embodiment, when the vehicle 100 deviates from the route and then returns to the route, the CD mode is maintained in the first zone subsequent to the return. Then, the travel mode of the vehicle 100 is controlled based on the travel plan from the next zone. This limits occurrence of the above control hunting.

Figure 12:
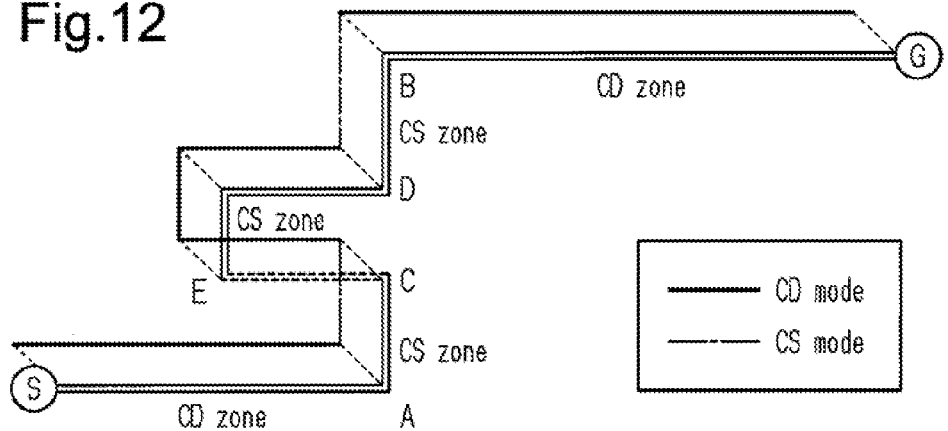
FIG. 12 is a diagram showing another example of the mode control performed by the vehicle controller of the third embodiment on the route that is in accordance with the travel plan, the route deviated from the route, and a recalculated route.

Additionally, as shown in FIG. 12, when the vehicle 100 travels the zone between point A and point B and deviates from the route at point C, the travel mode of the vehicle 100 is controlled in the CD mode. Then, when the fixed time elapses at point E from when the vehicle 100 deviates from the route, the navigation system 120 recalculates the route from point E to destination G. The mode planning unit 151 forms a travel plan in the recalculated route. Thus, when determining that the route is recalculated at point E, the mode control unit 152 maintains the CD mode in the zone between point E and point D, which serves as the zone including point E through which the vehicle 100 first travels subsequent to the recalculation.

When determining that the navigation system 120 recalculates the route at point E, shown in FIG. 12 (step S3 of FIG. 10: YES), the mode control unit 152 maintains the CD mode in the zone between point E and point D, which serves as the zone including E through which the vehicle 100 first travels subsequent to the recalculation (step S6 of FIG. 10). As a result, the travel mode of the vehicle 100 is maintained in the CD mode throughout the zone from point C, at which the vehicle 100 deviates from the route, to point D.

In this case, the mode control unit 152 controls the travel mode of the vehicle 100 based on the newly formed travel plan from the next zone of the newly formed travel plan. This limits the occurrence of the above control hunting.

The third embodiment has the advantages described below in addition to advantage (1) of the first embodiment.

(4) When the vehicle 100 deviates from the planned route and travels in the CD mode, the vehicle 100 may return to a zone of the route that is assigned with the CS mode. Even in this case, the vehicle 100 continues to travel the zone in the CD mode. This avoids control hunting caused by the mode shifting that occurs when the vehicle 100 returns to a zone of the route that is assigned with the CS mode but the remainder of the zone is short and the next zone is assigned with the CD mode.

(5) When the vehicle 100 deviates from the planned route and travels in the CD mode, the route is recalculated to form a new travel plan after the fixed time elapses. Even when the first zone of the recalculated route is assigned with the CS mode, the vehicle 100 continues to travel the first zone of the recalculated route in the CD mode. This avoids control hunting caused by the mode shifting that occurs when the first zone of the recalculated route is assigned with the CS mode but the remainder of the zone is short and the next zone is assigned with the CD mode.

Fourth Embodiment

A fourth embodiment of the vehicle controller will now be described with reference to FIGS. 13 to 15. The vehicle controller of the fourth embodiment differs from that of the first embodiment in that when the vehicle 100 deviates from the planned route and then the vehicle 100 returns to the route or the route is recalculated, if the first zone subsequent to the return or recalculation is a CS zone and the distance to the next CD zone is shorter than or equal to a fixed distance, the travel mode of the vehicle 100 is maintained in the CD mode up to the next CD zone. The description will focus on the differences from the first embodiment.

Figure 13:
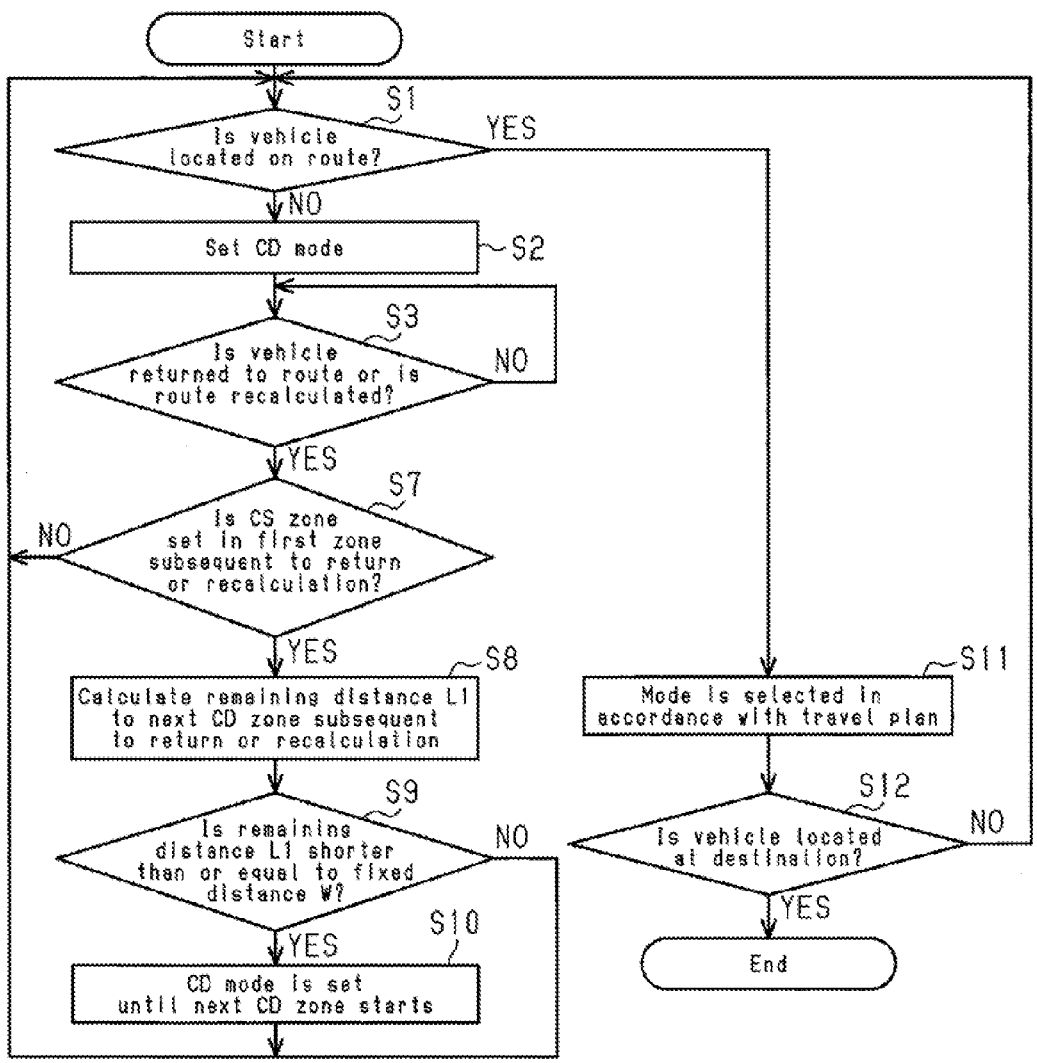
FIG. 13 is a flowchart showing the procedures of the mode control process performed by a fourth embodiment of the vehicle controller.

As shown in FIG. 13, the mode control unit 152 of the fourth embodiment performs the process that is the same as steps S1 to S3 of the first embodiment. When determining that the vehicle 100 returns to the planned route or the navigation system 120 recalculates the route, if the first zone subsequent to the return or recalculation is a CS zone (step S7: YES), the mode control unit 152 calculates a remaining distance L to the next CD zone subsequent to the return or recalculation (step S8).

Here, when the vehicle 100 deviates from the planned route and returns to a CS zone of the route, the remaining distance to the next CD zone may be short. In such a case, if the vehicle 100 is controlled in the CD mode only while the vehicle 100 deviates from the route, the so-called control hunting would occur in which the mode is shifted from the CD mode to the CS mode then in the CD mode in a short time. In this regard, when the vehicle 100 deviates from the planned route and then returns to the route, if the first zone of the route subsequent to the return is a CS zone and the remaining distance L to the next CD zone is shorter than or equal to a fixed distance W, the mode control unit 152 maintains the travel mode of the vehicle 100 in the CD mode up to the next CD zone.

Additionally, when the vehicle 100 deviates from the planned route and the route is recalculated, the first zone of the recalculated route may be a CS zone and the remaining distance L to the next CD zone may be short. Also, in such a case, if the vehicle 100 is controlled in the CD mode only while the vehicle 100 deviates from the route, the so-called control hunting would occur in which the mode is shifted from the CD mode to the CS mode then in the CD mode in a short time. In this regard, when the vehicle 100 deviates from the planned route and then the route is recalculated, if the first zone of the recalculated route is a CS zone and the remaining distance L to the next CD zone is shorter than or equal to the fixed distance W, the mode control unit 152 maintains the travel mode of the vehicle 100 in the CD mode up to the next CD zone.

Figure 14:
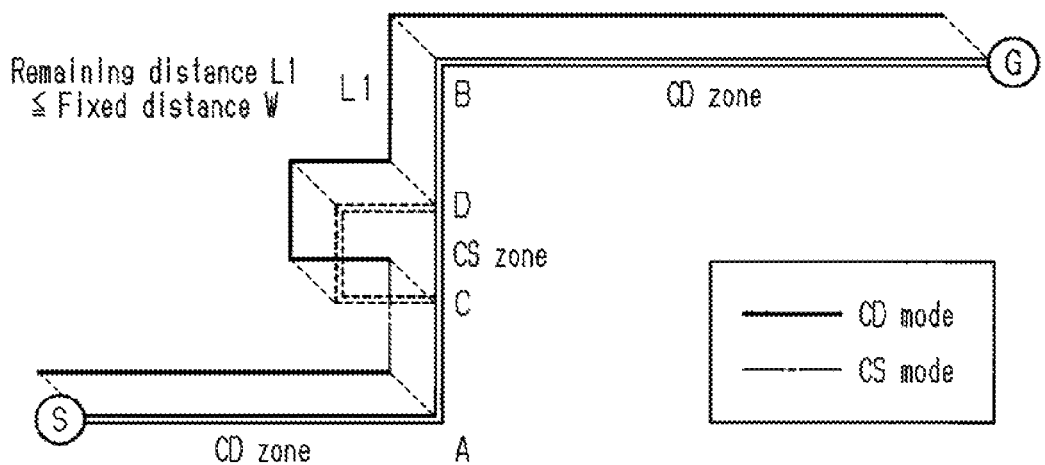
FIG. 14 is a diagram showing an example of the mode control performed by the vehicle controller of the fourth embodiment on a route that is in accordance with a travel plan and a route deviated from the route.

More specifically, as shown in FIG. 13, when determining that the vehicle 100 deviates from the planned route at point C, shown in FIG. 14, and then returns to the route at point D (step S3 of FIG. 13: YES) and determining that the zone between point D and point B, which serves as the first zone including point D subsequent to the return, is a CS zone (step S7 of FIG. 13: YES), the mode control unit 152 calculates a remaining distance L1 to the zone between point B and destination G, which is the next CD zone from the CS zone (step S8). Then, the mode control unit 152 determines whether or not the calculated the remaining distance L1 is shorter than or equal to the fixed distance W (step S9). When determining that the remaining distance L1, corresponding to the distance from point D to point B of FIG. 14, is shorter than or equal to the fixed distance W (L1≤W) (step S9: YES), the mode control unit 152 sets the travel mode of the vehicle 100 in the CD mode from point D, at which the vehicle 100 returns, to point B, at which the next CD zone starts (step S10). Consequently, the travel mode of the vehicle 100 is maintained in the CD mode throughout the zone from point C to point B, shown in FIG. 14.

In this manner, in the present embodiment, when the vehicle 100 deviates from the route and returns to the route, the CD mode is maintained up to point B, at which the next CD zone starts. Then, the travel mode of the vehicle 100 is controlled based on the travel plan from the next zone. This avoids the occurrence of the above control hunting.

When determining that the remaining distance L, corresponding to the distance to the next CD zone, is longer than the fixed distance W (L>W) (step S9: NO), the mode control unit 152 controls the travel mode of the vehicle 100 in the originally assigned CS mode. In this case, the travel distance to a location where the mode is next shifted in the CD mode is longer than the fixed distance W. Thus, the above control hunting may be avoided even when the mode is selected in accordance with the travel plan of the route to which the vehicle 100 returns.

Figure 15:
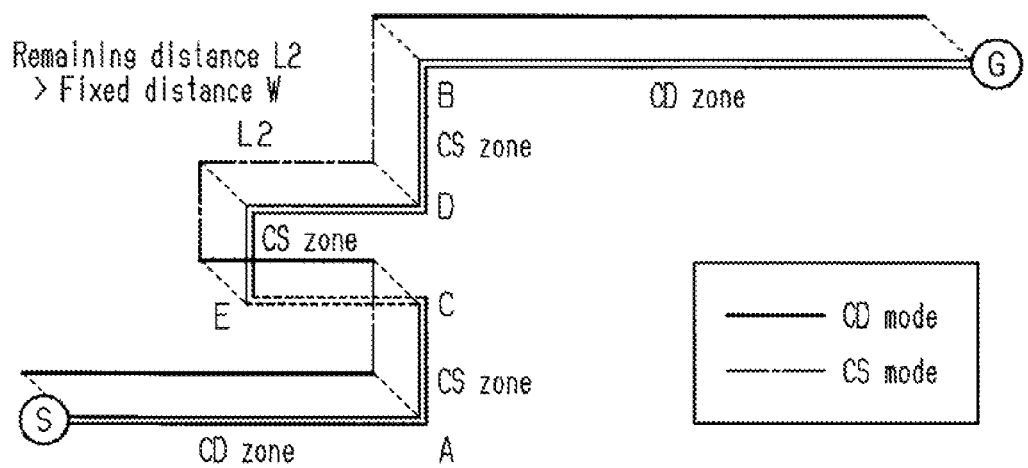
FIG. 15 is a diagram showing another example of the mode control performed by the vehicle controller of the fourth embodiment on the route that is in accordance with the travel plan, the route deviated from the route, and a recalculated route.

Additionally, as shown in FIG. 15, when the vehicle 100 travels the zone between point A to point B and deviates from the route at point C, the travel mode of the vehicle 100 is controlled in the CD mode. Then, when the fixed time elapses at point E from when the vehicle 100 deviates from the route, the navigation system 120 recalculates the route from point E to destination G. The mode planning unit 151 forms a travel plan in the recalculated route.

When determining that the navigation system 120 recalculates the route at point E, shown in FIG. 15 (step S3 of FIG. 13: YES) and determining that the zone between point E and point D, which serves as the first zone including point E subsequent to the recalculation, is a CS zone (step S7 of FIG. 13: YES), the mode control unit 152 calculates a remaining distance L2 to the zone from point B to destination G, corresponding to the next CD zone from the CS zone (step S8). Then, the mode control unit 152 determines whether or not the calculated the remaining distance L2 is shorter than or equal to the fixed distance (step S9). When determining that the remaining distance L2, corresponding to the distance from point E to point B of FIG. 15, is longer than the fixed distance W (L2>W) (step S9: NO), the mode control unit 152 controls the vehicle 100 in the CS mode, which is re-assigned to the zone between point E and point B. In this case, the travel distance to a location where the mode is next shifted in the CD mode is longer than the fixed distance W. Thus, the above control hunting may be avoided even when the mode is selected in accordance with the newly formed travel plan.

When determining that the remaining distance L, corresponding to the distance to the next CD zone, is shorter than or equal to the fixed distance W (L≤W) (step S9: YES), the mode control unit 152 maintains the travel mode of the vehicle 100 in the CD mode regardless of the CS mode assigned to the first zone subsequent to the recalculation.

The fourth embodiment has the advantages described below in addition to advantage (1) of the first embodiment.

(6) When the vehicle 100 deviates from the planned route and travels in the CD mode, the vehicle 100 may return to a CS zone of the route. In this case, if the distance to a CD zone that is located after the CS zone is shorter than or equal to the fixed distance, the vehicle 100 continues to travel in the CD mode. This avoids control hunting caused by the mode shifting that occurs when the distance to the zone, which is assigned with the CD mode and located after the zone to which the vehicle 100 returns, is shorter than the fixed distance.

(7) When the vehicle 100 deviates from the planned route and travels in the CD mode, the route is recalculated to form a new travel plan after the fixed time elapses. Even when the first zone of the recalculated route is a CS zone, if the distance to a CD zone located after the CS zone is shorter than or equal to the fixed distance, the vehicle 100 continues to travel in the CD mode. This avoids control hunting caused by the mode shifting that occurs when the distance in the CD zone, which is located after a zone including the first zone of the newly formed travel plan, is shorter than the fixed distance.

Other Embodiments

It should be apparent to those skilled in the art that the present disclosure may be embodied in many other specific forms without departing from the scope of the disclosure. Particularly, it should be understood that the present disclosure may be embodied in the following forms.

Figure 16:
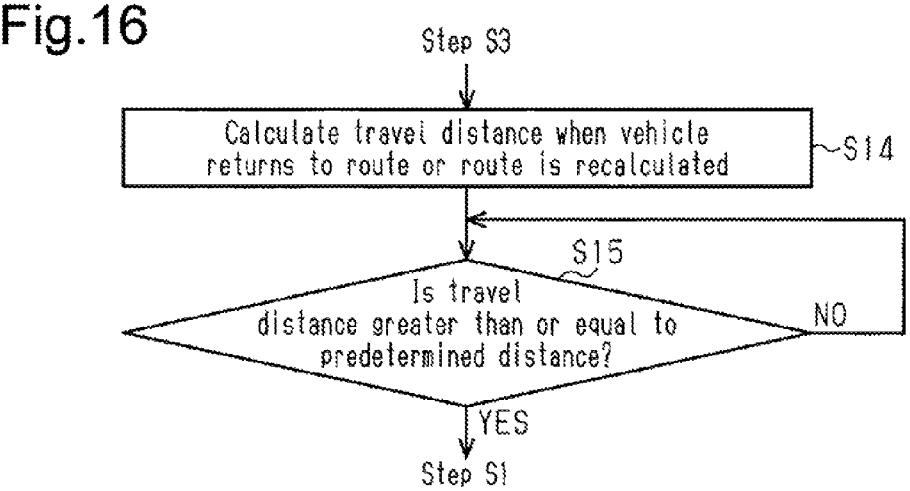
FIG. 16 is a flowchart showing a partially modified example of the process of FIG. 6 in a modified example of the second embodiment.

In the second embodiment, in step S4 of FIG. 6, the mode control unit 152 calculates a time elapsed from the return or recalculation. In step S5 of FIG. 6, the mode control unit 152 determines whether or not the elapsed time is greater than or equal to the predetermined time. Instead, as shown in FIG. 16, the mode control unit 152 may calculate a travel distance when the vehicle 100 returns to the route or the route is recalculated, corresponding to step S14, and determine whether or not the travel distance is greater than or equal to the predetermined distance, corresponding to step S15.

In the first to fourth embodiments, in step S3 of the flowcharts of FIGS. 2, 6, 10, 13, logical disjunction is used, for the sake of simplicity, to process two different determinations, including whether the vehicle 100 deviates from the route and returns to the same route and whether the route is recalculated to form a new travel plan after the fixed time (e.g., one minute) elapses from when the vehicle 100 deviates from the route. Instead, each embodiment may separately process the two determinations. In this case, for example, the vehicle may undergo control that combines a process for when the vehicle 100 deviates from the route and returns to the same route and a process for when the route is recalculated after the fixed time elapses from when the vehicle 100 deviates from the route.

Figure 17:
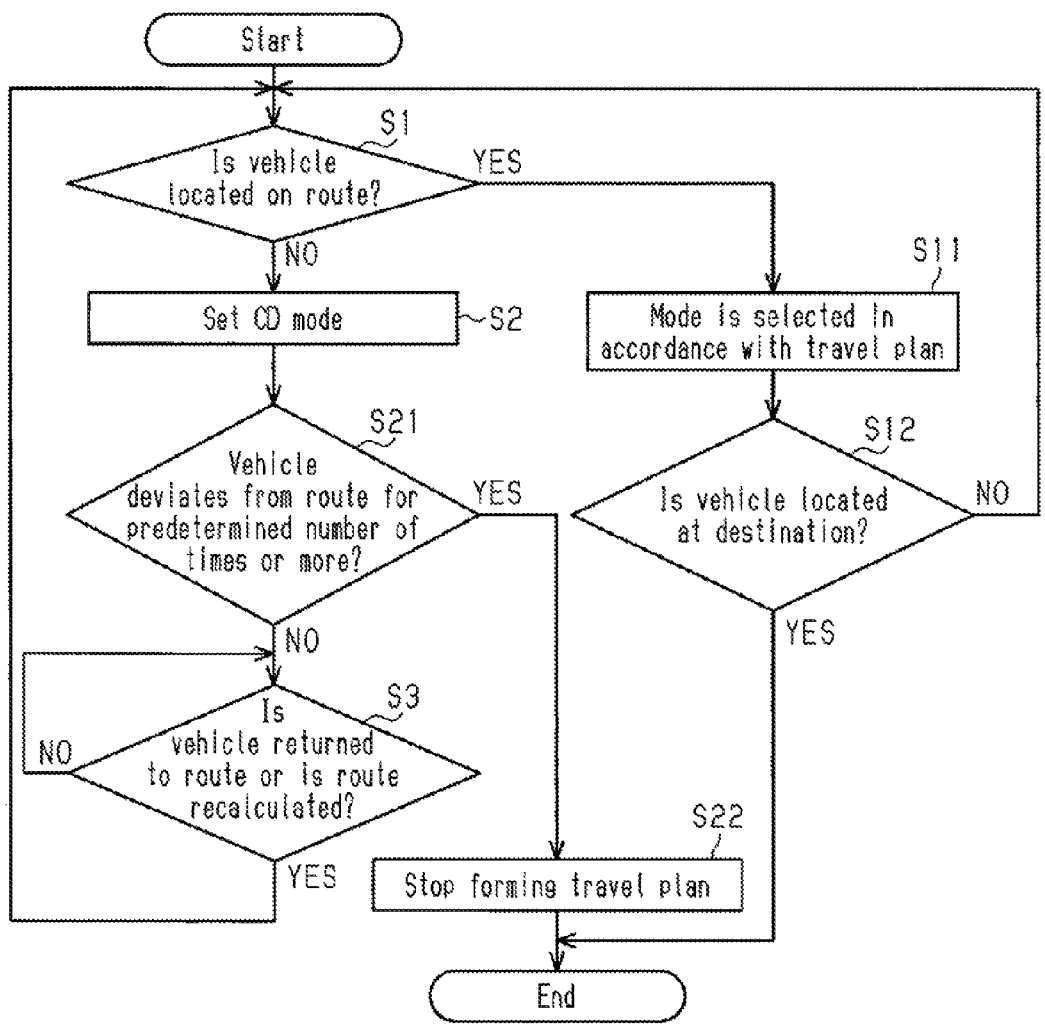
FIG. 17 is a flowchart showing the procedures of an additional process in each embodiment.
Figure 18:
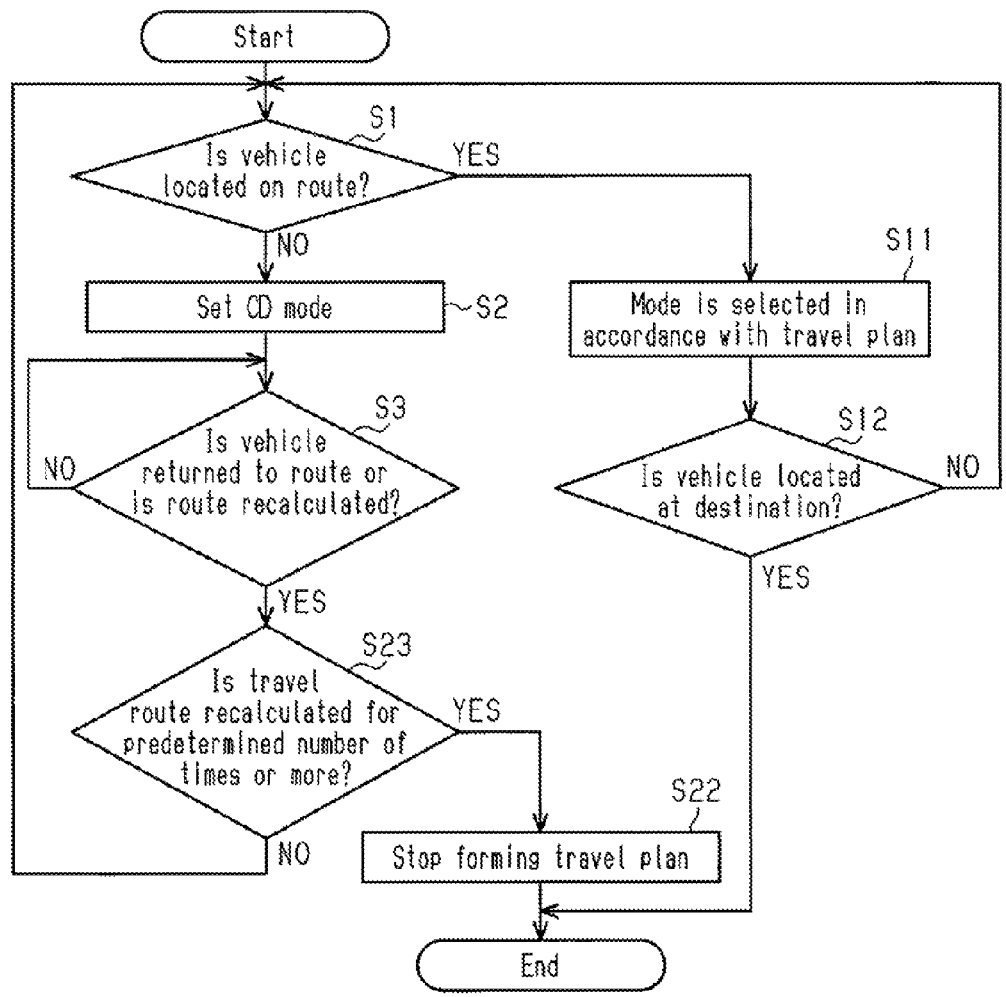
FIG. 18 is a flowchart showing a modified example of the additional process shown in FIG. 17.

In each embodiment, when the vehicle 100 deviates from the route for a predetermined number of times, the travel mode of the vehicle 100 may be maintained in the CD mode and the formation of the travel plan may be interrupted. For example, as shown in FIG. 17, a process for determining whether or not the vehicle 100 deviates from the route for the predetermined number of times or more is added between step S2 and step S3 of each embodiment. More specifically, when determining that the vehicle 100 deviates from the route for the predetermined number of times or more (step S21: YES), the mode control unit 152 stops the mode planning unit 151 from forming the travel plan while maintaining the CD mode (step S22). Alternatively, when the recalculation of the route is repeated for a predetermined number of times or more, the travel mode of the vehicle 100 may be maintained in the CD mode and the formation of the travel plan may be interrupted. As shown in FIG. 18, when the recalculation of the route is repeated for the predetermined number of times or more (step S23: YES), the formation of the travel plan is interrupted while the travel mode of the vehicle 100 is maintained in the CD mode (step S22). In either case, priority is given to the CD mode. Thus, a situation in which unused storage power remains in the battery 113 tends to be avoided even when the travel plan is not formed.

In each embodiment, the mode control unit 152 may provide one-to-one correspondence for the mode and the traveling such that the vehicle 100 performs the EV traveling while controlled in the CD mode and performs the HV traveling while controlled in the CS mode.

In the above embodiments, the in-vehicle network NW is illustrated as a CAN. Instead, the in-vehicle network NW may be configured by another network such as Ethernet (registered trademark), FlexRay (registered trademark), or IEE1394 (FireWire (registered trademark)) as long as a network communicably connects the ECU and the like. Alternatively, the in-vehicle network NW may include CAN and be configured by combination of the networks.

In the above embodiments, the position detection unit 101 is connected to the navigation controller 121 via the in-vehicle network NW. Instead, the position detection unit 101 may be directly connected to the navigation controller 121.

In the above embodiments, the navigation system 120 and the travel assist unit 150 are separately configured. Instead, the navigation system 120 and the travel assist unit may be arranged in the same apparatus.

In the above embodiments, the hybrid controller 110 and the travel assist unit 150 are arranged in the same apparatus. Instead, the hybrid controller and the travel assist unit may be arranged in different apparatuses.

In the above embodiments, the devices such as the navigation system 120 and the display 125 are integrated with the vehicle 100. Instead, the functions of devices including the navigation system and the display may be entirely or partially implemented by a portable information processing device such as a mobile phone or a smartphone as long as the devices are connected to one another in a communicable manner.

In the above embodiments, the travel assist unit 150, the navigation system 120, the map information database 122, and the like are mounted in the vehicle 100. Instead, an external information processing device or a portable information processing device may partially include the functions of the travel assist unit, the navigation system, the map information database, and the like. An example of the external information processing device is an information processing center. Examples of the portable information processing device are a mobile phone and a smartphone. The eternal information processing device may exchange information through a wireless communication line. The mobile information processing device may be connected to the in-vehicle network or through a near field communication or exchange information through a wireless communication line.

In the above embodiments, the travel assist unit 150 assigns the travel mode. Instead, the navigation controller or the like may assign the travel mode.

In the above embodiments, the travel mode is assigned mainly when the originating point is located on the current position of the vehicle 100. However, when the travel mode is assigned, the originating point may be located at any position of the vehicle 100, which is moving to the destination. Further, the travel mode may be appropriately assigned regardless of the position of the vehicle 100.

In the above embodiments, the vehicle 100 is illustrated as a plug-in hybrid vehicle. Instead, the vehicle 100 may be a hybrid vehicle in which the storage power amount is increased. The travel plan may be applied to decrease the storage power amount to a reference value.

The present examples and embodiments are to be considered as illustrative and not restrictive, and the disclosure is not to be limited to the details given herein, but may be modified within the scope and equivalence of the appended claims.

The invention claimed is:

1. A vehicle controller that performs travel control on a vehicle, wherein the vehicle selects one of a first mode and a second mode as a travel mode and travels in the travel mode, the vehicle consumes electric power of a battery when traveling in the first mode and sustains a storage power amount of the battery when traveling in the second mode, and the vehicle travels along a route from an originating point to a destination, wherein the route includes a plurality of zones, the vehicle controller comprising:
a processor programmed to
form a travel plan that assigns one of the first mode and the second mode to each of the zones included in the route; and
control traveling of the vehicle based on the formed travel plan,
wherein the processor is programmed to set the travel mode of the vehicle to the first mode when the vehicle deviates from the route.

2. The vehicle controller according to claim 1, wherein when the vehicle deviates from the route and then returns to the route, the processor is programmed to maintain the travel mode of the vehicle in the first mode for a predetermined time or a predetermined distance regardless of the formed travel plan.

3. The vehicle controller according to claim 1, wherein when the vehicle deviates from the route and then returns to the route, the processor is programmed to maintain the travel mode of the vehicle in the first mode in a zone of the route where the vehicle first travels subsequent to the return regardless of the formed travel plan.

4. The vehicle controller according to claim 1, wherein when the vehicle deviates from the route and then returns to the route, if the second mode is assigned to a zone of the route where the vehicle first travels subsequent to the return and a distance to a zone where the first mode is assigned for a first time after the zone where the vehicle first travels subsequent to the return is shorter than or equal to a fixed distance, the processor is programmed to maintain the travel mode of the vehicle in the first mode at least until the zone where the first mode is assigned for the first time after the zone where the vehicle first travels subsequent to the return.

5. The vehicle controller according to claim 1, wherein the processor is programmed to recalculate the route and form a new travel plan when a fixed time elapses from when the vehicle deviates from the route, and
when the vehicle deviates from the route and the route is recalculated, the processor is programmed to maintain the travel mode of the vehicle in the first mode for a predetermined time or a predetermined distance regardless of the newly formed travel plan.

6. The vehicle controller according to claim 5, wherein when deviation of the vehicle from the route or the recalculation is repeated for a predetermined number of times or more,
the processor is programmed to maintain the travel mode of the vehicle in the first mode, and
the processor is programmed to stop forming the travel plan.

7. The vehicle controller according to claim 1, wherein the processor is programmed to recalculate the route and form a new travel plan when a fixed time elapses from when the vehicle deviates from the route, and
when the vehicle deviates from the route and the route is recalculated, the processor is programmed to maintain the travel mode of the vehicle in the first mode in a zone of the route where the vehicle first travels subsequent to the recalculation regardless of the newly formed travel plan.

8. The vehicle controller according to claim 1, wherein the processor is programmed to recalculate the route and form a new travel plan when a fixed time elapses from when the vehicle deviates from the route, and
when the vehicle deviates from the route and the route is recalculated, if the second mode is assigned to a zone of the route where the vehicle first travels subsequent to the recalculation and a distance to a zone where the first mode is assigned for a first time after the zone where the vehicle first travels subsequent to the recalculation is shorter than or equal to a fixed distance, the processor is programmed to maintain the travel mode of the vehicle in the first mode at least until the zone where the first mode is assigned for the first time after the zone where the vehicle first travels subsequent to the recalculation.

9. A vehicle controller that performs travel control on a vehicle, wherein the vehicle selects one of a first mode and a second mode as a travel mode and travels in the travel mode, the vehicle gives priority to driving of a motor while limiting or prohibiting driving of an internal combustion engine when traveling in the first mode, the vehicle drives at least one of the motor and the internal combustion engine when traveling in the second mode, and the vehicle travels along a route from an originating point to a destination, wherein the route includes a plurality of zones, the vehicle controller comprising:

a processor programmed to form a travel plan that assigns one of the first mode and the second mode as the travel mode to each of the zones included in the route; and control traveling of the vehicle based on the formed travel plan, wherein the processor is programmed to forcibly set the travel mode of the vehicle in the first mode when the vehicle deviates from the route.

10. A method of travel control on a vehicle performed by a vehicle controller, the method comprising:

selecting one of a first mode and a second mode as a travel mode and the vehicle traveling in the travel mode;

consuming electric power of a battery when the vehicle traveling in the first mode;

sustaining a storage power amount of the battery when the vehicle traveling in the second mode;

traveling by the vehicle along a route from an originating point to a destination, wherein the route includes a plurality of zones;

forming a travel plan that assigns one of the first mode and the second mode to each of the zones included in the route;

controlling traveling of the vehicle based on the formed travel plan; and setting the travel mode of the vehicle to the first mode when the vehicle deviates from the route.

11. A method of travel control on a vehicle performed by a vehicle controller, the method comprising:

selecting one of a first mode and a second mode as a travel mode and the vehicle traveling in the travel mode;

giving priority to driving of a motor while limiting or prohibiting driving of an internal combustion engine when the vehicle traveling in the first mode;

driving at least one of the motor and the internal combustion engine when the vehicle traveling in the second mode;

traveling by the vehicle along a route from an originating point to a destination, wherein the route includes a plurality of zones;

forming a travel plan that assigns one of the first mode and the second mode as the travel mode to each of the zones included in the route;

controlling traveling of the vehicle based on the formed travel plan; and forcibly setting the travel mode of the vehicle in the first mode when the vehicle deviates from the route.

* * * * *